United States Patent [19]

Arikawa et al.

[11] 4,421,361
[45] Dec. 20, 1983

[54] BRAKE FLUID PRESSURE CONTROL APPARATUS IN SKID CONTROL SYSTEM

[75] Inventors: Tetsuro Arikawa; Hideyuki Yamada, both of Yokosuka, Japan

[73] Assignee: Nippon Air Brake Co., Ltd., Kobe, Japan

[21] Appl. No.: 328,697

[22] Filed: Dec. 8, 1981

[30] Foreign Application Priority Data

Dec. 10, 1980 [JP] Japan ................. 55-173956
Dec. 15, 1980 [JP] Japan ................. 55-176775

[51] Int. Cl.³ .......................... B60T 17/18; B60T 8/02
[52] U.S. Cl. ................................. 303/92; 303/116
[58] Field of Search ............... 303/10, 11, 92, 116, 303/119

[56] References Cited

U.S. PATENT DOCUMENTS

| | | |
|---|---|---|
| 3,549,212 | 12/1970 | Leiber . |
| 3,550,966 | 12/1970 | Leiber . |
| 3,942,844 | 3/1976 | Inada et al. ............ 303/92 |
| 3,948,568 | 4/1976 | Leiber . |
| 3,981,543 | 9/1976 | Atkins ................... 303/92 |
| 4,240,672 | 12/1980 | Tokunaga et al. ..... 303/92 |
| 4,264,111 | 4/1981 | Shimizu et al. ........ 303/92 |

Primary Examiner—Duane A. Reger
Attorney, Agent, or Firm—McDougall, Hersh & Scott

[57] ABSTRACT

A brake fluid pressure control apparatus in a skid control system for a vehicle having at least one wheel and a brake for the wheel includes a control unit for measuring the skid condition of the wheel; a fluid pressure control valve device arranged between a master cylinder and a wheel cylinder of a brake for the wheel, the fluid pressure control valve device receiving control signals of the control unit to control the brake fluid pressure to the wheel cylinder; a hydraulic reservoir which, when the brake fluid pressure to the wheel cylinder is decreased with control of the fluid pressure control valve device, reserves the brake fluid discharged through the fluid pressure control valve device from the wheel cylinder; a pressure fluid supply conduit connecting the master cylinder with the fluid pressure control valve device; a fluid pump with motor receiving a pump drive signal of the control unit for returning the brake fluid from the hydraulic reservoir into the pressure fluid supply conduit; a switching arrangement for detecting operation of the fluid pump with motor, and generating an operation detecting signal when the fluid pump with motor effectively operates; and a pump fail detecting circuit receiving the pump drive signal of the control unit and the output of the switching arrangement, and generating a pump fail detecting signal after and when receiving the pump drive signal, and when the switching arrangement does not generate the operation detecting signal.

20 Claims, 6 Drawing Figures

BRAKE FLUID PRESSURE CONTROL APPARATUS IN SKID CONTROL SYSTEM

BACKGROUND OF THE INVENTION

1. Field of the Invention

This invention relates to a brake fluid pressure control apparatus in a skid control system for a vehicle having at least one wheel and a brake for the wheel in which the brake fluid pressure to the wheel cylinder of the brake for the wheel is controlled in accordance with the rotational condition or skid condition of the wheel, and more particularly to a brake fluid pressure control apparatus of the type in which, when the brake for the wheel is relieved, brake fluid discharged through a fluid pressure control valve device from the wheel cylinder of the brake into a hydraulic reservoir is returned to a pressure fluid supply conduit connected to a master cylinder by a fluid pump with motor, and which is provided with a pump fail detecting circuit for detecting the fail of the fluid pump with motor.

2. Description of the Prior Art

Recently, various kinds of skid control systems have been developed for a vehicle having at least one wheel and a brake for the wheel, by which skid control operation for the wheel is performed to avoid a locked wheel condition and obtain good braking performance on any road. In any of the skid control systems, the rotational condition or skid condition of the wheel such as deceleration, slip and acceleration is measured by the control unit which receives the detecting signal of the wheel speed sensor which is associated with the wheel for detecting the rotational speed of the wheel. The brake fluid pressure to the brake for the wheel is controlled on the basis of the measurement of the control unit.

Methods for measuring the rotational condition or skid condition of the wheel can be roughly classified into three. In the first method, slip of the wheel is obtained from the vehicle speed and the wheelspeed, and the obtained slip of the wheel is compared with a predetermined slip. In the second method, acceleration or deceleration of the wheel is obtained, and the obtained acceleration or deceleration of the wheel is compared with a predetermined acceleration or deceleration. And in the third method, slip and acceleration or deceleration of the wheel are obtained from the vehicle speed and wheel speed, and the obtained slip and acceleration or deceleration of the wheel are compared with the predetermined slip and acceleration or deceleration.

A brake fluid pressure control apparatus is arranged between a master cylinder as a brake pressure generating member and the brake for the wheel. Control signals from the control unit as the measurement result are supplied to the brake fluid pressure control apparatus for increasing and decreasing, or increasing, maintaining at constant, and decreasing the brake pressure to the brake for the wheel.

Such a brake fluid pressure control apparatus is known that includes a brake fluid pressure control valve device to which the control signals from the control unit are supplied, to control the brake fluid pressure to the wheel cylinder of the brake for the wheel, a hydraulic reservoir for reserving the brake fluid discharged through the brake fluid pressure control valve device from the wheel cylinder of the brake, when relieved, and a fluid pump with motor receiving a drive signal from the control unit for returning the brake fluid from the hydraulic reservoir into the pressure fluid supply conduit connecting the master cylinder and the brake fluid pressure control valve device.

In the above brake fluid pressure control apparatus, the brake fluid from the wheel cylinder of the brake is discharged into the hydraulic reservoir to relieve the brake for the wheel, and at once, it is returned to the pressure fluid supply conduit by the fluid pump with motor. When the brake for the wheel is reapplied, the brake fluid is supplied through the brake fluid pressure control valve device into the wheel cylinder of the brake from the pressure fluid supply conduit.

However, if the fluid pump with motor fails or is wrong, it does not operates with the drive signal supplied from the control unit. The brake fluid cannot be returned to the pressure fluid supply conduit from the hydraulic reservoir. Accordingly, whenever the brake for the wheel is reapplied, brake fluid should be supplied from the master cylinder into the wheel cylinder. The displacement of the brake pedal increases. At last, the displacement of the piston of the master cylinder might reach the full stroke, and it might become impossible to reapply the brake.

On the other hand, when the brake fluid cannot be returned to the pressure fluid supply conduit from the hydraulic reservoir, the volume of the brake fluid in the hydraulic reservoir increases whenever the brake for the wheel is relieved. At last, it might reach the capacity of the hydraulic reservoir and it might become impossible to relieve the brake.

Accordingly, if the fluid pump with motor fails, there is the fear that the skid control system becomes inoperative.

SUMMARY OF THE INVENTION

Accordingly, it is an object of this invention to provide a brake fluid pressure control apparatus in a skid control system in which the fail of the fluid pump with motor can be detected.

Another object of this invention is to provide a brake fluid pressure control apparatus in a skid control system in which the driver can be warned of the fail of the fluid pump with motor.

A further object of this invention is to provide a brake fluid pressure control apparatus in a skid control system in which something wrong in the conduit system can be detected.

In accordance with an aspect of this invention, a brake fluid pressure control apparatus in a skid control system for a vehicle having at least one wheel and a brake for the wheel includes: (A) a control unit for measuring the skid condition of the wheel; (B) a fluid pressure control valve device arranged between a master cylinder and a wheel cylinder of a brake for the wheel, the fluid pressure control valve device receiving control signals of the control unit to control the brake fluid pressure to the wheel cylinder; (C) a hydraulic reservoir which, when the brake fluid pressure to the wheel cylinder is decreased with control of the fluid pressure control valve device, reserves the brake fluid discharged through the fluid pressure control valve device from the wheel cylinder; (D) a pressure fluid supply conduit connecting the master cylinder with the fluid pressure control valve device; (E) a fluid pump with motor receiving a pump drive signal of the control unit for returning the brake fluid from the hydraulic reservoir into the pressure fluid supply conduit; (F) a switching arrangement for detecting operation of the fluid pump with motor, and generating an operation detecting signal when the fluid pump with motor effectively operates; and (G) a pump fail detecting circuit receiving the pump drive signal of the control unit and the output of the switching arrangement, the pump fail detecting circuit generating a pump fail detecting signal after and when receiving the pump drive signal, and when the switching arrangement does not generate the operation detecting signal.

The foregoing and other objects, features, and advantages of the present invention will be more readily understood upon consideration of the following detailed description of the preferred embodiment of the invention, taken in conjunction with the accompanying drawings.

DESCRIPTION OF THE REFERRED EMBODIMENTS

Next, brake fluid pressure control apparatus in skid control systems according to embodiments of this invention will be described with reference to the drawings.

Figure 1:
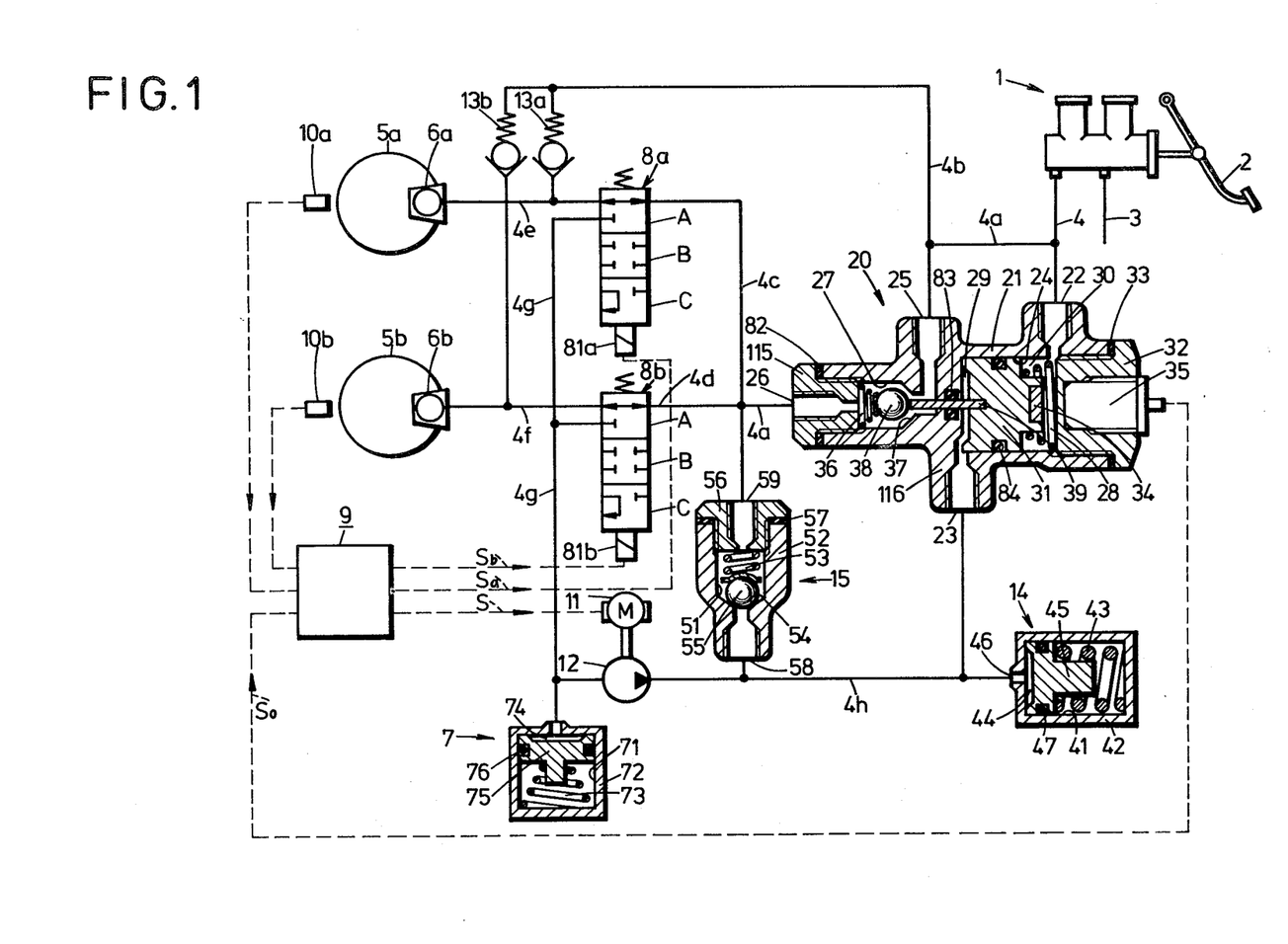
FIG. 1 is a schematic view of a brake fluid pressure control apparatus in a skid control system according to a first embodiment of this invention.

FIG. 1 shows a brake fluid pressure control apparatus in a skid control system according to a first embodiment of this invention. It is applied to front wheels of the vehicle. In FIG. 1, a tandem master cylinder 1 has the well-known structure, and it include first and second pistons connected through a spring with each other. The first piston is connected to a brake pedal 2 to be treaded by the driver. The cylinder body and, the first and second pistons define first and second brake fluid pressure generating chambers, although not shown. The first brake fluid pressure generating chamber may be connected through a conduit 3 and almost the same as the apparatus of FIG. 1 to wheel cylinders of the brakes for the rear wheels. The second fluid pressure generating chamber communicates with a conduit 4. The conduit 4 is divided into a pressure fluid supply conduit 4a and a pressure fluid return conduit 4b.

The pressure fluid supply conduit 4a is connected through a controllable check valve device 20 to be hereinafter described in detail, and conduits 4c and 4d to electromagnetic three-position change-over valves 8a and 8b.

A fluid pressure control valve device is constituted by the electromagnetic three-position change-over valves 8a and 8b. Feeding openings of the change-over valves 8a and 8b are connected through conduits 4e and 4f to the wheel cylinder 6a and 6b of the wheels 5a and 5b. Discharging openings thereof are connected through a conduit 4g to a hydraulic reservoir 7. In the hydraulic reservoir 7, a piston 75 is slidably supported by a relatively weak spring 73 in a bore 71 of a body 72, and a seal ring 76 is fitted to the piston 75. A reserving chamber 74 is formed by the body 72 and the piston 75, communicating with the conduit 4g. The brake fluid discharged from the wheel cylinder 6a and 6b is temporarily reserved in the chamber 74 of the reservoir 7.

The conduit 4g, is further connected to the inlet of the fluid pump 12 which is driven by an electric motor 11. The outlet of the fluid pump 12 is connected trough a conduit 4h to a hydraulic accumulator 14, a pressure adjusting valve 15 to be hereinafter described in detail, and the controllable check valve device 20.

In the hydraulic accumulator 14, a piston 45 is slidably supported by a relatively strong spring 43 in a bore 41 of a body 42, and a seal ring 47 is fitted to the piston 45. An accumulating chamber 44 is formed by the body 42 and the piston 45, communicating through an opening 46 with the conduit 4h. When a brake fluid pressure at the opening 46 becomes higher than a predetermined value which is, for example, 150 kg/cm$^2$, the piston 45 starts to be moved against the spring 43 so as to accumulate brake fluid.

On the other hand, the pressure fluid return conduit 4b is connected through check valves 13a and 13b to the wheel cylinders 6a and 6b, respectively. The check valves 13a and 13b are opened when brake fluid flows from the wheel cylinders 6a and 6b toward the master cylinder 1.

Wheel speed sensors 10a and 10b are associated with the front wheels 5a and 5b, and they generate pulse signals having frequencies proportional to the rotational speeds of the front wheels 5a and 5b. The pulse signals of the wheel speed sensors 10a and 10b are supplied to a control unit 85 (FIG. 2) in an electronic apparatus 9 to be hereinafter decreased in detail. The control unit 85 has the well-known circuits. On the basis of the detecting outputs of the wheel speed sensors 10a and 10b, the skid condition or rotational condition of the front wheels 5a and 5b, namely wheel speeds of the front wheels 5a and 5b, slips thereof, and accelerations or decelerations thereof are calculated or measured by the control unit 85. Control signals Sa and Sb as the calculation or measurement results are generated from the control unit 85, and are supplied to solenoid portions 81a and 81b. Dash lines in FIG. 1 represent electric lead wires.

Although schematically shown, the electromagnetic change-over valves 8a and 8b have well-known constructions. When the control signals Sa and Sb are "0" in voltage or level, the change-over valves 8a and 8b take first positions A for increasing the brake pressure to the brake for the wheel, respectively. In the first position A, the master cylinder side and the wheel cylinder side are made to communicate with each other. When the control signals Sa and Sb are "½" in voltage or level, the change-over valves 8a and 8b take second positions B for maintaining the brake pressure to the brake at constant, respectively. In the second position B, the communications between the master cylinder side and the wheel cylinder side, and between the wheel cylinder side and the reservoir side are interrupted. When the control signals Sa and Sb are "1" in voltage on level, the change-over valves 8a and 8b take third positions C for decreasing the brake pressure to the brake, respectively. In the third position C, the communication between the master cylinder side and the wheel cylinder side is interrupted, while the communication between the wheel cylinder side and the reservoir side is made. The brake fluid is discharged through the conduit 4g into the reservoir 7 from the wheel cylinders 6a and 6b.

The electronic apparatus 9 further generates a drive signal S for the motor 11. When anyone of the control signals Sa and Sb becomes initially "½" or "1", the drive signal S is generated, and it is kept during the skid control operation. The drive signal S is supplied to the motor 11. Further, such a signal $S_o$ is supplied to the electronic apparatus 9 from the controllable check valve device 20 to be hereinafter described in detail, as to detect that the fluid pump 12 and the motor 11 normally operate.

Next, there will be described the details of the controllable check valve device 20 arranged in the pressure fluid supply conduit 4a.

Two bores 24 and 27 are formed in a main body 21. They are partitioned by a partition wall portion 116 of the main body 21. Inlet openings 22 and 25 are made in an upper wall portion of the main body 21. The conduit 4 is connected to the inlet opening 22. The pressure fluid supply conduit 4a branched from the conduit 4 is connected to the inlet opening 25. Accordingly, the fluid pressure of the master cylinder 1 is transmitted to the inlet openings 22 and 25. Further, a fluid pump pressure supply opening 23 is formed in a lower wall portion of the main body 21. The outlet of the fluid pump 12 is connected through the conduit 4h to the fluid pump pressure supply opening 23.

The opening of the one bore 24 of the main body 21 is fluid-tightly covered by a cover member 32 which is screwed to the main body 21 and is sealed with a seal ring 33. The opening of the other bore 27 of the main body 21 is fluid-tightly covered by a cover member 115 which is screwed to the main body 21 and is sealed with a seal ring 82. An outlet opening 26 is made in the cover member 115. The change-over valves 8a and 8b are connected through the valve side conduit 4a to the outlet opening 26. The latter communicates with the left bore 27 of the main body 21.

A piston 31 sealed with a seal ring 84 is slidably fitted to the right bore 24 of the main body 21, and it is urged leftwards by a compression spring 28 which is arranged between the piston 31 and the cover member 32. Normally, the piston 31 contacts with a part of the partition wall portion 116, as shown in FIG. 1. The right bore 24 is partitioned into a master cylinder pressure chamber 30 and a pump pressure chamber 29 by the piston 31. The master cylinder pressure chamber 30 communicates through the inlet opening 22 with the fluid pressure generating chamber of the master cylinder 1. The pump pressure chamber 29 communicates through the opening 23 and the conduit 4h with the outlet of the fluid pump 12.

A permanent magnet 34 is fixed in a recess of the right end portion of the piston 31. A magnetic sensing switch 35 is screwed into a recess of the cover member 32, corresponding to the permanent magnet 34. It includes a reed switch or a magneto-resistance element. When the piston 31 is moved rightwards to contact the magnet 34 with the cover member 32, as described hereinafter, the magnetic sensing switch 35 generates the detecting signal So representing that the fluid pump 12 and the motor 11 normally operate. The detecting signal So is supplied to the electronic apparatus 9.

A valve ball 38 is arranged in the left bore 27, and it is urged rightwards by a spring 36. Normally, it contacts with a top end of a rod 39 sealed with a seal ring 83. The rod 39 slidably passes through the partitioning wall portion 116, and it is fixed to the piston 31. A stepped portion of the left bore 27 is tapered to form a valve seat 37 for the valve ball 38. In the shown condition, the valve ball 38 contacting with the top end of the rod 39 is separated from the valve seat 37, so that the outlet opening 26 communicates through the left bore 27 with the inlet opening 25.

Next, there will be described the details of the pressure adjusting valve 15 arranged between the outlet of the fluid pump 12 and the outlet opening 26 of the controllable check valve device 20.

A valve bore 51 is formed in a main body 52. A valve ball 55 is arranged in the bore 51. An upper opening of the valve bore 51 is fluid-tightly closed by a cover member 56 which is screwed to the main body 52, and is sealed with a seal ring 57. An outlet opening 59 is formed in the cover member 56, communicating with the valve bore 51, and it is connected to the pressure fluid supply conduit 4a. A stepped portion of the valve bore 51 is tapered to form a valve seat 54 for the valve ball 55. The valve ball 55 is urged downwards by a pressure adjusting spring 53. Normally, the valve ball 55 contacts with the valve seat 54. An inlet opening 58 is made in the lower portion of the main body 52, and it is connected through the conduit 4h to the outlet of the fluid pump 12. Normally, the communication between the inlet opening 58 and the outlet opening 59 is interrupted by the valve ball 55. When a valve opening pressure is represented by Po, an input fluid pressure at the inlet opening 58 by Pin, and an output fluid pressure at the outlet opening 59, by Pout, the output fluid pressure Pout is so adjusted as to be equal to (Pin−Po). The valve opening pressure Po is determined by a spring force of the pressure adjusting spring 53 and the opening area closed by the valve ball 55 sitting on the valve seat 54. It is, for example, 5 to 10 kg/cm².

Next, there will be described the details of the electronic apparatus 9 with reference to FIG. 2.

Figure 2:
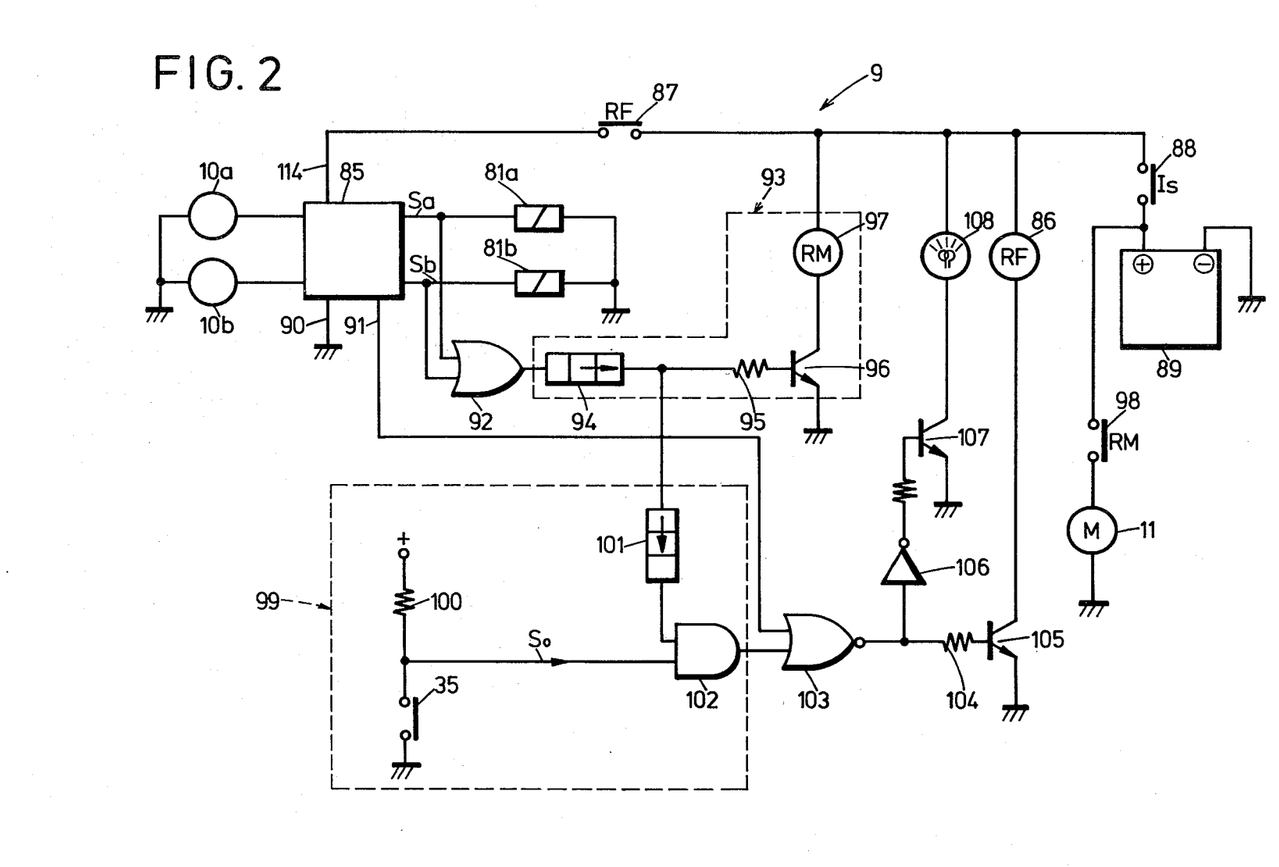
FIG. 2 is a circuit diagram of an electronic apparatus and the parts associated with the electronic apparatus in FIG. 1.

In FIG. 2, the control unit 85, as above described, receive the output signals of the wheel speed sensors 10a and 10b, and generates the control signals Sa and Sb. The signals Sa and Sb are supplied to the solenoid portions 81a and 81b of the change-over valves 8a and 8b, and to an OR gate 92. The control unit 85 further has power source lines 90 and 114, and a fail signal output line 91. The one power source line 114 is connected through a contact portion 87 of a fail safe relay 86 and a contact portion 88 of an ignition switch to a plus terminal of a battery 89. The other power source line is connected to the ground. A fail signal "1", when the control unit 85 fails, is obtained from the fail signal output line 91 of the control unit 85. The fail signal output line 91 is connected to one input terminal of a NOR gate 103.

An output terminal of the OR gate 92 is connected to a motor drive circuit 93 which is constituted by an OFF delay timer 94, a resistor 95, a transistor 96 and a motor relay 97. The delay time of the OFF delay timer 94 is so set that, once the output of the OR gate 92 becomes "1", the output of the OFF delay timer 94 is maintained at the higher level to put the transistor 96 into the conductive state during the skid control operation. When either of the control signals Sa and Sb becomes "½" or "1", the output of the OR gate 92 becomes "1". A contact portion 98 of the motor relay 97 is connected between the plus terminal of the battery 89 and the motor 11.

A pump fail detecting circuit 99 according to this embodiment is constituted by a resister 100, the switch 35 in the controllable check valve device 20, an ON delay timer 101 and an AND gate 102. An output terminal of the AND gate 102 is connected to another input terminal of the NOR gate 103. An input terminal of the ON delay timer 101 is connected to the output terminal of the OFF delay timer 94 of the motor drive circuit 93, and an output terminal of the ON delay timer 101 is connected to one input terminal of the AND gate 102. The time required for the fluid pump 12 to effectively work after the motor drive signal S is generated, is considered for the delay time of the ON delay timer 101. One end of the resistor 100 is connected to another input terminal of the AND gate 102, and to one stationary contact of the switch 35. Another stationary control of the switch 35 is connected to the ground. Another terminal of the resistor 100 is connected to the plus terminal of the battery 89.

An output terminal of the NOR gate 103 is connected through a resistor 104 to a base of a transistor 105, and through a NOT gate 106 and a resistor to a base of a transistor 107. A collector of the transistor 105 is connected through the fail safe relay 86 and the contact portion 88 of the ignition switch to the plus terminal of the battery 89. An emitter of the transistor 105 is connected to the ground. A collector of the transistor 107 is connected through a fail lump 108 as a fail warning member, and the contact portion 88 of the ignition switch to the plus terminal of the battery 89. An emitter of the transistor 107 is connected to the ground. When the ignition switch is turned on for engine start, the contact portion 88 is closed.

Next, there will be described operation of the apparatus of FIG. 1 in the case that the fluid pump 12 normally operates.

The driver starts to tread the brake pedal 2 in order to brake the vehicle running at constant speed. It is judged by the control unit 85 receiving the detecting signals of the wheel speed sensors 10a and 10b that the deceleration and slip of the wheels 5a and 5b do not still reach the predetermined slip and deceleration at the braking start. The control signals Sa and Sb of the control unit 85 are at the lower levels "0". The solenoid portions 81a and 81b of the change-over valves 8a and 8b are deenergized. The change-over valves 8a and 8b are in the position A, respectively. The conduits 4c and 4e, and 4d and 4f are made to communicate with each other, respectively. The brake fluid from the master cylinder 1 flows through the pressure fluid supply conduit 4a, the controllable check valve device 20, the conduits 4c and 4d, valves 8a and 8b, and the conduits 4e, and 4f into the wheel cylinders 6a and 6b to brake the wheels 5a and 5b. On the other hand, the brake fluid from the master cylinder 1 is checked by the check valves 13a, and 13b. Accordingly, it cannot flow through the pressure fluid return conduit 4b.

With the increase of the brake fluid pressure to the wheel cylinders 6a and 6b, the slip or deceleration of the wheels 5a and 5b meanwhile reaches the predetermined slip or deceleration. The levels of the control signals Sa and Sb become "½" or "1". The solenoid portions 81a and 81b of the valve 8a and 8b are energized by the control signals Sa and Sb, respectively. For simplification of description, it is assumed that both of the control signals Sa and Sb becomes "1". The change over valves 8a and 8b are changed over into the position c, respectively. The communication between the pressure fluid supply conduit 4a and the wheel cylinders 6a and 6b is interrupted while the communication between the wheel cylinders 6a and 6b, and the reservoir 7 is made.

When anyone of the control signals Sa and Sb becomes "½" or "1", the drive signal S is generated to drive the motor 11. The fluid pump 12 starts to be driven. The brake fluid discharged into the reservoir 7 through the conduit 4g from the wheel cylinders 6a and 6b is fed from the reservoir 7 to the conduit 4h by the fluid pump 12.

At the start of the braking operation, the piston 31 in the controllable check valve device 20 is in the position shown in FIG. 1. The discharging fluid pressure of the fluid pump 12 is supplied to the supply opening 23 of the controllable check valve device 20. The fluid pressure in the pump pressure chamber 29 of the check valve device 20 increases with the discharging fluid pressure of the fluid pump 12. When it becomes higher than the sum of the urging force of the spring 28 and fluid pressure in the master cylinder pressure chamber 30 which communicates through the inlet opening 22 with the master cylinder 1, the piston 31 is moved rightwards with the rod 39. The valve ball 38 becomes able to sit on the valve seat 37 by spring action of the spring 36. After that time, the controllable check valve device 20 functions as a usual check valve. Brake fluid can flow through the check valve device 20 from the master cylinder 1 toward the change-over valves 8a and 8b, while brake fluid cannot flow from the side of the change-over valves 8a and 8b toward the master cylinder 1.

With the rightward movement of the piston 31, the permanent magnet 34 contacts with the cover member 32. Magnetic flux from the permanent magnet 34 is sensed by the magnetic sensing switch 35. The signal So detecting that the fluid pump 12 normally operates, is generated by the magnetic sensing switch 35, and it is supplied to the electronic apparatus 9.

The discharging fluid pressure of the fluid pump 12 further increases. When it becomes higher by more than the opening pressure Po of the pressure adjusting valve 15, than the fluid pressure of the master cylinder 1, the valve ball 55 is separated from the valve seat 54 against the spring 53, so that the brake fluid from the fluid pump 12 is returned through the pressure adjusting valve 15 to the pressure fluid supply conduit 4a of the change-over valves side. However, since the valve ball 38 sits on the valve seat 37 in the controllable check valve device 20, the brake fluid cannot flow into the master cylinder 1. Accordingly, no "kick back" is imparted to the brake pedal 2.

During the skid control operation, the control signals Sa and Sb change as "0" "½" and "1". However, the fluid pump 12 always operates, and the piston 31 is located at the right position in the check valve device 20. The valve ball 38 is always able to sit on the valve seat 37. Accordingly, the controllable check valve device 20 always functions as a usual check valve. The signal So continues to be supplied to the electronic apparatus 9.

When the change-over valves 8a and 8b are changed over into the position B, the communications between the check valve device 20 and the wheel cylinders 6a and 6b, and the wheel cylinders 6a and 6b, and the reservoir 7 are cut. The brake fluid pressure in the wheel cylinders 6a and 6b is maintained at constant. Although the fluid pump 12 always operates during the skid control operation, no "kick-back" is imparted to the brake pedal 2, since the controllable check valve device 20 functions as a usual check valve, and brake fluid cannot flow toward the master cylinder 1.

On the other hand, in FIG. 2, the contact portion 88 of the ignition switch is closed with the engine start. In the beginning of the braking operation, the control signals Sa and Sb are "0". Accordingly, the output of the OR gate 92, and therefore the output of the ON delay timer 101 are "0". The output of the AND gate 102 is "0". The output of the fail signal output line 91 of the control unit 85 is initially "0", even though the control unit 85 fails. Accordingly, the output of the NOR gate 103 is initially "1". The transistor 105 becomes conductive. The fale safe relay 86 is energized to close the contact portion 87. The electric power is supplied to the control unit 85. When the control unit 85 is in order, the output of the fail signal output line 91 remains "0". When either of the control signals Sa and Sb becomes "½" or "1", the output of the OR gate 92 becomes "1", and it is supplied through the OFF delay timer 94 and the resistor 95 to the base of the transistor 96. The latter becomes conductive to energize the motor relay 97 and close the contact portion 98 thereof. The motor 11 starts to rotate and to drive the fluid pump 11. Although the output of the OR gate 92 is supplied to the one input terminal of the AND gate 102, after the delay time of the ON delay timer 101, the detecting signal So, the level of which is "0", has been supplied to the other input terminal of the AND gate 102, since the discharging pressure of the fluid pump 11 has reached the predetermined pressure to close the switch 35 in the controllable check valve device 20. Accordingly, the output of the AND gate 102 remains "0". As soon as the brake fluid is discharged into the reservoir 7 from the wheel cylinders 6a and 6b, it is pressurized and returned through the pressure adjusting valve 15 to the conduit 4a of the change-over valves side by the fluid pump 11. During the skid control operation, the control signals Sa and Sb change as "0", "½" or "1" in accordance with the skid conditions of the wheels 5a and 5b. Correspondingly, the change-over valves 8a and 8b take one of the positions A, B and C to increase, maintain at constant or decrease the brake fluid pressure.

The above-described control operations are repeated. Meanwhile, the vehicle speed reaches the desired speed, or the vehicle stops. The brake pedal 2 is released from treading. The fluid pressure at the side of the master cylinder 1 with respect to the check valves 13a and 13b becomes lower than the fluid pressure at the side of the wheel cylinders 6a and 6b with respect to it, with the release of the brake pedal 2, in the pressure fluid return conduit 4b. The brake fluid flows back through the conduits 4e and 4f, check valves 13a and 13b into the master cylinder 1 from the wheel cylinders 6a and 6b. Thus, the skid control operation ends, and the wheels 5a and 5b are almost released from braking. However, when the fluid pressure of the wheel cylinder side with respect to the check valves 13a and 13b becomes lower than the minimum actuatable pressure of the check valves 13a and 13b, the check valves 13a, and 13b cannot be opened, and the brake fluid cannot flow from the wheel cylinders 6a and 6b toward the master cylinder 1.

On the other hand, the fluid pump 12 stops with the end of the skid control operation, and the change-over valves 8a and 8b are in the position A. The piston 31 in the controllable check valve device 20 is located at the original position shown in FIG. 1. Accordingly, the brake fluid from the wheel cylinders 4a and 4b returns through the change-over valves 8a and 8b, and the controllable check valve device 20 into the master cylinder 1 so that the brake fluid pressure in the wheel cylinders 6a and 6b becomes substantially zero. There is no problem on a residual brake fluid pressure due to the check valves 13a and 14b.

Next, there will be described the case that the control unit 85 fails.

The output of the line 91 of the control unit 85 becomes "1" with the failure thereof. It is supplied to the NOR gate 103. The output thereof becomes "0". Accordingly, the transistor 105 becomes non-conductive. The fail safe relay 86 deenergized to open the contact portion 87 thereof. The control unit 85 is accordingly intercepted from the battery 89.

The output of the NOR gate 103 is inverted by the NOT gate 106. The output "1" thereof is supplied to the base of the transistor 107. The latter becomes conductive. The fail lamp 108 lights up to inform the driver of the failure of the skid control system.

Next, there will be described the case that the fluid pump 12 or the motor 11 for driving the fluid pump 12 fails.

When the fluid pump 12 or the motor 11 fails during the skid control operation, the fluid pump 12 stops or the discharging pressure of the fluid pump 12 extraordinarily lowers. The piston 31 in the check valve device 20 is moved leftwards to open the switch 35. When the fluid pump 12 or the motor 11 fails before the skid control operation, the piston 31 is not moved rightwards, and the switch 35 remains opened.

In FIG. 2, the input to the AND gate 102 connected to the switch 35 becomes "1" or remains "1". On the other hand, when either of the control signals Sa and Sb becomes "½" or "1", the output of the OR gate 92 becomes "1", and it is supplied through the OFF delay timer 94 and the ON delay timer 101 to the other input terminal of the AND gate 102. The output of the AND gate 102 becomes "1" in the delay time of the ON delay timer 101 after the control signal Sa or Sb becomes "½" or "1". Accordingly, the output of the NOR gate 103 becomes "0". The transistor 105 become non-conductive, while the transistor 107 becomes conductive. The fail safe relay 86 is deenergized to open the contact portion 87 thereof. The control unit 85 is intercepted from the battery 89. The fail lamp 108 lights up to inform the driver of the failure of the skid control system.

Such a failure can be detected that there is any leakage in the conduit system and so the discharging pressure of the fluid pump 12 can not rise to the predetermined pressure, although the fluid pump 12 and the motor 11 do not fail.

Figure 3:
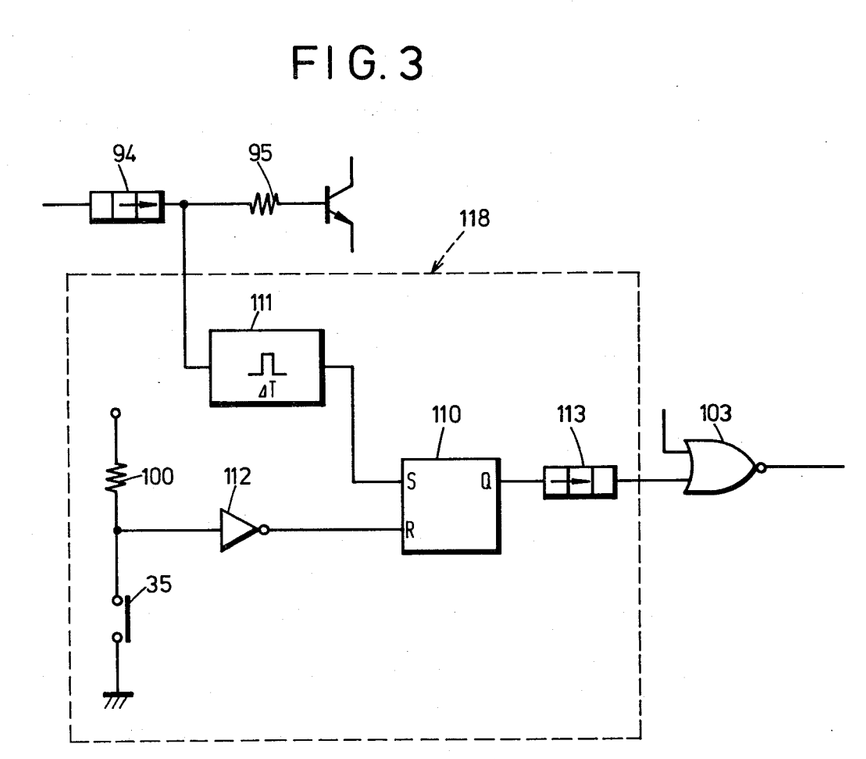
FIG. 3 is a circuit diagram of an important part of an electronic apparatus in a brake fluid pressure control apparatus in a skid control system according to a second embodiment of this invention.

FIG. 3 shows an important part of a brake fluid pressure control apparatus in a skid control system according to a second embodiment of this invention. Parts in FIG. 3 which correspond to those in FIG. 2, are denoted by the same reference numerals.

This embodiment is different from the first embodiment in construction of the pump fail detecting circuit. The other parts are the same as in the first embodiments.

A pump fail detecting circuit 118 according to this embodiment consists of a flip flop 110, a monostable multivibrator 111 connected to a set terminal of the flip flop 100, a NOT gate 112 connected to a reset terminal of the flip flop 110, an ON delay timer 113 connected to a Q output terminal of the flip flop 110, the resistor 100 and the switch 35. The ON delay timer 113 corresponds to the ON delay timer 101 of the first embodiment. The delay time of the ON delay timer 113 is so set as to be longer than the time extending from the time when the motor drive signal S is generated, to the time when the switch 35 is closed by the discharging pressure of the normally operating fluid pump 12. The input terminal of the NOT gate 112 is connected to the one end of the resistor 100 and the one stationary contact of the switch 35.

When the motor drive signal from the OFF delay timer 94 is supplied to the monostable multibrator 111, a pulse of a predetermined time ΔT is generated from the monostable multivibrator 111, and it is supplied to the set terminal S of the flip flop 110 to set the latter. The Q output of the flip flop 110 becomes "1". When the fluid pump 12 and the motor 11 are in order, the switch 35 in the check valve device 20 is closed, before the delay time of the ON delay timer 113 lapses. The output of the NOT gate 112 becomes "1" to reset the flip flop 110. The Q output of the flip flop 110 again becomes "0". Accordingly, the output of the ON delay timer 113 remains "0". Unless the fail detecting signal from the control unit 85 is supplied to the other input terminal of the NOR gate 103, the fail signal does not generate from the NOR gate 103.

When the fluid pump 12 or the motor 11 fails, and the switch 35 is not closed, the output of the NOT gate 112 does not become "1". The monostable multivibrator 111 generates the pulse of the predetermined time ΔT with the motor drive signal. The flip flop 110 is set by the pulse. Since the output of the NOT gate 112 does not become "1", the flip flop 110 is not reset, but it is kept in the set condition. The output of the ON delay timer 113 becomes "1" in the delay time thereof, and it is supplied to the NOR gate 103. The output of the NOR gate 103 becomes "0". The fail lamp 108 shown in FIG. 2 lights up to inform the driver of the failure of the skid control system.

Figure 4:
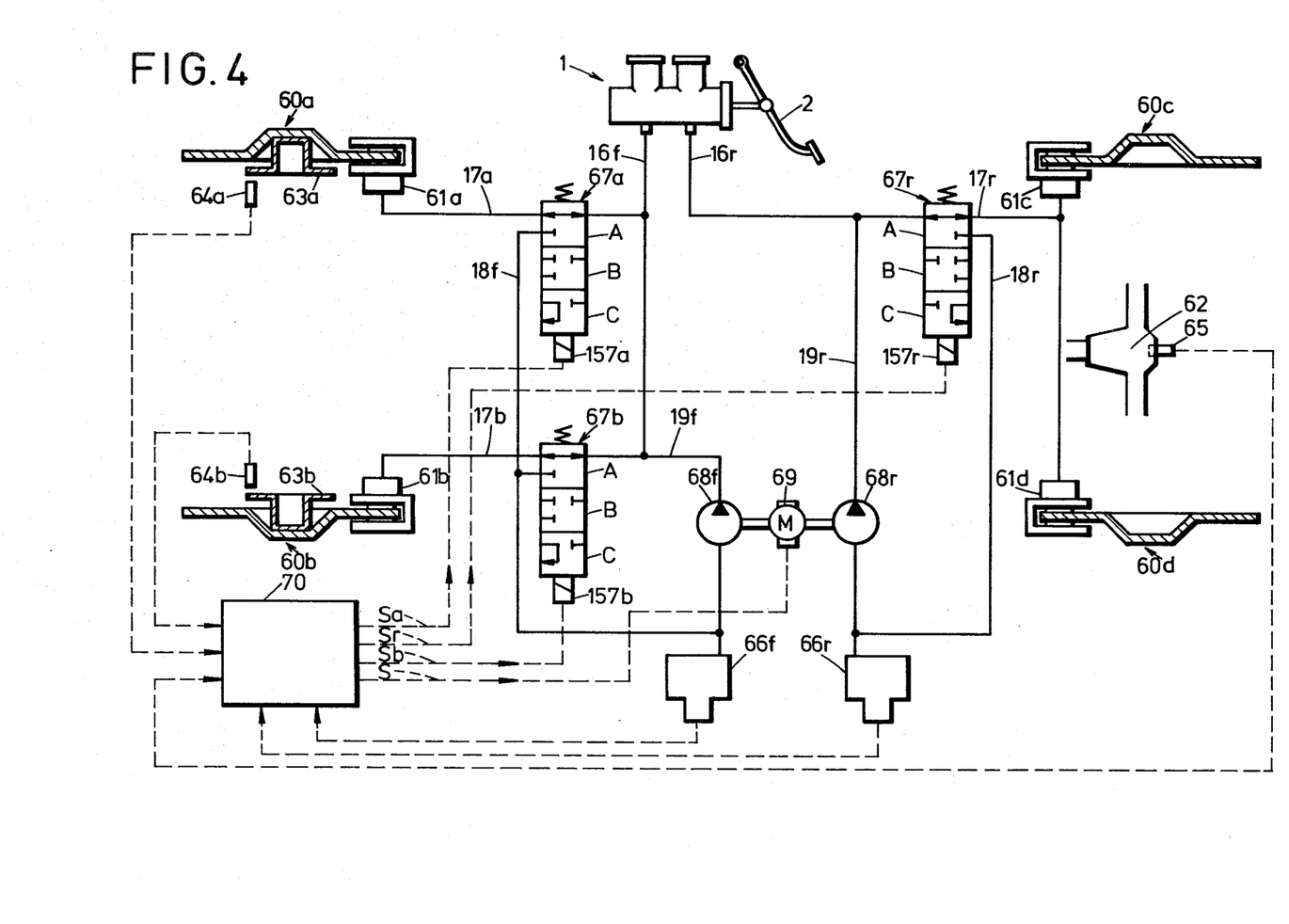
FIG. 4 is a schematic view of a brake fluid pressure control apparatus in a skid control system according to a third embodiment of this invention.

FIG. 4 shows a brake fluid pressure control apparatus in a skid control system according to a third embodiment of this invention.

The first fluid pressure generating chamber of the master cylinder 1 is connected through a conduit 16r to a conduit system for rear wheels 60c and 60d. The second fluid pressure generating chamber of the master cylinder 1 is connected through a conduit 16f to a conduit system for front wheels 60a and 60b.

The conduit 16f is connected to electromagnetic three-position change-over valves 67a and 67b, while the conduit 16r is connected to an electromagnetic three-position change-over valve 67r which is common to the rear wheels 60c and 60d. A fluid pressure control valve device of this skid control system is constituted by the change-over valves 67a, 67b and 67r. Feeding openings of the change over valves 67a, 67b and 67r are connected through conduits 17a, 17b and 17r to wheel cylinders 61a, 61b, 61c and 61d of the wheels 60a, 60b, 60c and 60d, respectively. Discharge openings of the change-over valves 67a, 67b and 67r are connected through conduits 18f and 18r to hydraulic reservoirs 66f and 66r to be hereinafter described in detail, respectively. The conduits 18f and 18r are connected to inlet openings of fluid pumps 68f and 68r which is driven by a common electric motor 69. Outlet openings of the fluid pumps 68f and 68r are connected through conduits 19f and 19r to the conduits 16f and 16r.

Toothed rotors 63a and 63b for detecting the wheel speeds are fixed on the front wheels 60a and 60b. Wheel speed sensors 64a and 64b face to the teeth of the rotors 63a and 63b, and they generate pulses having frequencies proportional to the rotational speeds of the front wheels 60a and 60b. The detecting signals of the wheel speed sensors 64a and 64b are supplied to a control unit 150 in an electronic apparatus 70, the details of which will be hereinafter described with reference to FIG. 6. On the other hand, a gear in a differential gear assembly 62 is used as a rotor for detecting the wheel speed of the rear wheels 60c and 60d. A wheel speed sensor 65 faces to the gear, and it generates pulses having a frequency proportional to the mean rotational speed of the rear wheels 60c and 60d. The detecting signal of the wheel speed sensor 65 is supplied to the control unit 150 in the electronic apparatus 70.

The control unit 150 has the well known circuit construction, and it calculates or measures wheels speeds, decelerations, accelerations and slip ratios of the wheels 60a, 60b, 60c and 60d from the outputs of the wheel speed sensors 64a, 64b and 65. On the basis of the calculation or measurement results, it generates control signals Sa, Sb and Sr which are supplied to solenoids portions 157a, 157b and 157r of the change-over valves 67a, 67b and 67r. The latters has the same construction and function as the change-over valves 8a and 8b of the first embodiment.

Figure 5:
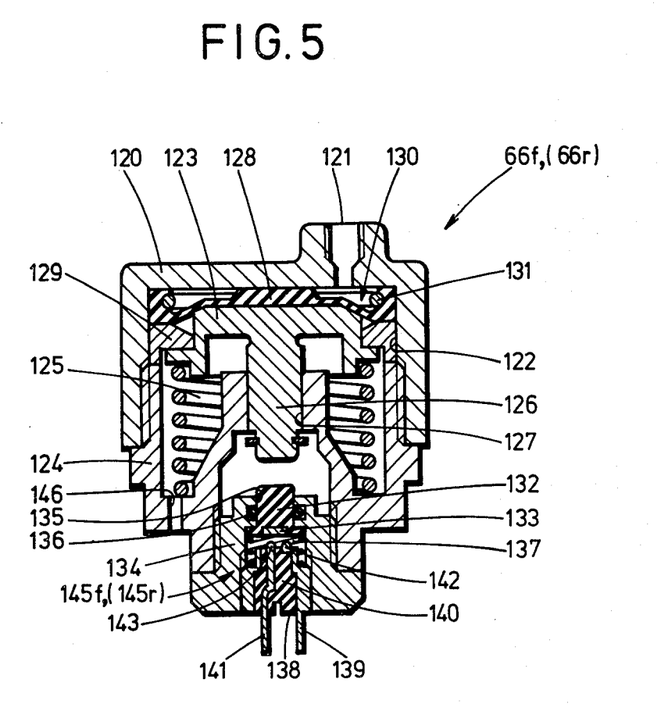
FIG. 5 is an enlarged cross-sectional view of a hydraulic reservoir in the apparatus of FIG. 4.

Next, there will be described the details of the reservoirs 66f and 66r with reference to FIG. 5. The reservoirs 66f and 66r has the same construction. Accordingly, only one of the reservoirs 66f and 66r will be described in detail.

In the reservoir 66f, a main body 120 is generally cup-shaped, and it has a bore 122. A connection opening 121 is formed in an upper wall portion of the main body 120, and it is connected to the conduit leading to the inlet opening of the fluid pump 68f. A diaphragm 128 made of rubber is fixed at its circumferential portion to the upper wall portion of the main body 120 by an elastic ring 131 and a spacer ring 129. A reserve chamber 130 is formed between the upper wall portion of the main body 120 and the diaphragm 128. In the bore 122, a piston 123 having a generally T-shaped cross section contacts with the diaphragm 128. The bore 122 is covered by a cover member 124 which is screwed to the main body 120. A bore 127 is made in an inner projecting portion of the cover member 124. A downward projection 126 of the piston 123 is slidably fitted to the bore 127. The piston 123 is upwards urged by a return spring 125 which is arranged between the cover member 124 and the piston 123, and it contacts with the spacer ring 129 and the diaphragm 128. A vent 146 is made in the bottom wall portion of the cover member 124. Accordingly, a space formed by the cover member 124 and the piston 123 in the bore 122 of the main body 120 communicates through the vent 146 with the atmosphere, and it is an air chamber.

A switch supporting member 134 is screwed to a central recess of the cover member 124. A stepped bore 135 is made in the switch supporting member 134. A movable switch member 132 is slidably fitted to the bore 135, sealed with a seal ring 136. A stationary switch member 138 is screwed to the switch supporting member 134 so as to face to the movable switch member 132. A spring 137 is arranged between the movable switch member 132 and the stationary switch member 138 to urge the movable switch member 132. The flange portion of the movable switch member 132 contacts with the stepped portion of the bore 135 to take an upper position. The movable switch member 132 is made of insulating material. A contact element 133 made of conductive material is fixed to the bottom of the movable switch member 132 so as to face to contact elements 142 and 143 of the stationary switch member 138. The contact elements 142 and 143 are electrically insulated from each other by insulator 140 in the stationary switch member 138. Connection terminals 139 and 141 formed integrally with the contact elements 142 and 143 are led out from the insulator 140, and, connected to the ground and the electronic apparatus 70, respectively. A pump operation detecting switch 145f is constituted by the movable switch member 132 and the stationary switch member 138.

Brake fluid from the wheel cylinders 61a and 61b, when the brake is relieved, is discharged into the reserve chamber 130. When the fluid pump 68f, normally operates, the brake fluid is immediately sucked up from the reserve chamber 130 by the fluid pump 68f. Accordingly, the volume of the reserve chamber 130 does not change from that shown in FIG. 5, on change little from the latter. However, when the fluid pump 68f fails, the brake fluid increases in the reserve chamber 130 with the discharge from the wheel cylinders 61a and 61b. Spring force of the return spring 125 is so designed that, when the fluid pressure in the reserve chamber 130 reaches a predetermined pressure, for example, 2 to 3 kg/cm$^2$, the piston 123 starts to move downwards to increase the volume of the reserve chamber 130. The downward projection 126 of the piston 123 comes to contact with the movable switch member 132. The latter is pushed downwards against the spring 137 so that the contact portion 133 contacts with the contact elements 142 and 143 of the stationary switch member 138. The pump operation detecting switch 145f is closed. In other words, when the fluid pump 68f normally operates, the pump operation detecting switch 145f is opened.

Next, there will be described the details of the electronic apparatus 70 with reference to FIG. 6.

The control unit 150 receives the output signals of the wheel speed sensors 64a, 64b and 65, and supplies the control signals Sa, Sb and Sr to the solenoid portions 157a, 157b and 157r of the change-over valves 67a, 67b and 67r, respectively, and further to an OR gate 159. Power source lines 151 and 156 are connected to the control unit 150. The one 151 of the power source lines is connected through a contact portion 153 of a fail safe relay 152 and a contact portion 154 of an ignition switch to a plus terminal of a battery 155. The other 156 of the power source lines is connected to the ground. The control unit 150 is further provided with a fail signal output line 158 which is connected to one input terminal of a NOR gate 169.

An output terminal of the OR gate 159 is connected to a motor drive circuit 180 which is constituted by an OFF delay timer 160, a resistor 161, a transistor 162 and a motor relay 163. The OFF delay timer 160 corresponds to the OFF delay timer 94 of the first embodiment. Once the output of the OFF delay timer 160 becomes "1", it is maintained during the skid control operation. The output of the OR gate 159 becomes "1" when anyone of the control signals Sa, Sb and Sr becomes "½" or "1". A contact portion 164 of the motor relay 163 is connected between the plus terminal of the battery 155 and the motor 69 for driving the fluid pumps 68f and 68r.

A pump fail detecting circuit 200 of this embodiment is constituted by resisters 165 and 166, the pump operation detecting switches 145f and 145r described with reference to FIG. 5, a NAND gate 178, an ON delay timer 167 and a AND gate 168. One stationary contacts of the switches 145f and 145r correspond to the one contact elements 142 in FIG. 5, and they are connected to the ground. Other stationary contacts of the switches 145f and 145r correspond to the other contact elements 143, and they are connected through the resistors 165 and 166 to the plus terminal of the battery 155. Further, they are connected to the NAND gate 178. The output terminal of the NAND gate 178 is connected through the ON delay timer 167 to one input terminal of the AND gate 168. The output of the OR gate 159 is connected to another input terminal of the AND gate 168.

An output terminal of the AND gate 168 is connected to another input terminal of the NOR gate 169. An output terminal of the NOR gate 169 is connected through a resistor 170 to a base of a transistor 171, and through a NOT gate 172 and a resistor to a base of a transistor 173. A collector of the transistor 171 is connected through the fail safe relay 152 and the contact portion 154 of the ignition switch to the plus terminal of the battery 155. An emitter of the transistor 171 is connected to the ground. A collector of the transistor 173 is connected through a fail lump 174 as a fail warning member, and the contact portion 154 of the ignition switch to the plus terminal of the battery 155. An emitter of the transistor 173 is connected to the ground. When the ignition switch is turned on for engine start, the contact portion 154 is closed.

Next, there will be described operation of the apparatus of FIG. 4 in the case that the fluid pumps 68f and 68r normally operate.

The driver starts to tread the brake pedal 2 in order to brake the vehicle running at constant speed. It is judged by the control unit 150 receiving the detecting signals of the wheel speed sensors 64a, 64b and 65 that the deceleration and slip of the wheels 60a to 60d do not still reach the predetermined slip and deceleration at the braking start. The wheel speeds of the rear wheels 60c and 60d correspond to the rotational speed of the differential gear 62. The control signals Sa, Sb and Sr of the control unit 150 are at the lower levels "0". The solenoid portions 157a, 157b and 157r of the change-over valves 67a, 67b and 67r are deenergized. The change-over valves 67a, 67b and 67r are in the position A, respectively. The conduits 16f and 17a, 16f and 17b, and 16r and 17r are made to communicate with each other, respectively. The brake fluid from the master cylinder 1 flows through the conduits 16f and 16r, valves 67a, 67b and 67r, and the conduits 17a, 17b and 17r into the wheel cylinders 61a to 61d to brake the wheels 60a to 60d.

With the increase of the brake fluid pressure to the wheel cylinders 61a to 61d, the slip or deceleration of the wheels 60a to 60d meanwhile reaches the predetermined slip or deceleration. The levels of the control signals Sa, Sb and Sr become "½" or "1". The solenoid portions 157a, 157b and 157r of the valves 67a, 67b and 67r are energized by the control signals Sa, Sb and Sr, respectively. For simplification of description, it is assumed that all of the control signals Sa, Sb and Sr becomes "1". The change over valves 67a, 67b and 67r are changed over into the position C, respectively. The communication between the master cylinder 1 and the wheel cylinders 61a to 61d is interrupted while the communication between the wheel cylinders 61a to 61d and the reservoirs 66f and 66r is made.

When anyone of the control signals Sa, Sb and Sr becomes "½" or "1", the drive signal S is generated to drive the motor 69. The fluid pumps 68f and 68r start to be driven. The brake fluid discharged into the reservoirs 66f and 66r through the conduits 18f and 18r from the wheel cylinders 61a to 61d is immediately returned from the reservoirs 66f and 66r to the conduits 16f and 16r by the fluid pumps 68f and 68r. During the skid control operation, the control signals Sa, Sb and Sr change as anyone of "0", "½" and "1". However, the fluid pumps 68f and 68r always operates to return the brake fluid from the reservoirs 66f and 66r. Accordingly, the pistons 123 in the reservoirs 66f and 66r move little, and so the switches 145f and 145r are not closed. In other words, the switches 145f and 145r generate the pump operating detecting signals.

Figure 6:
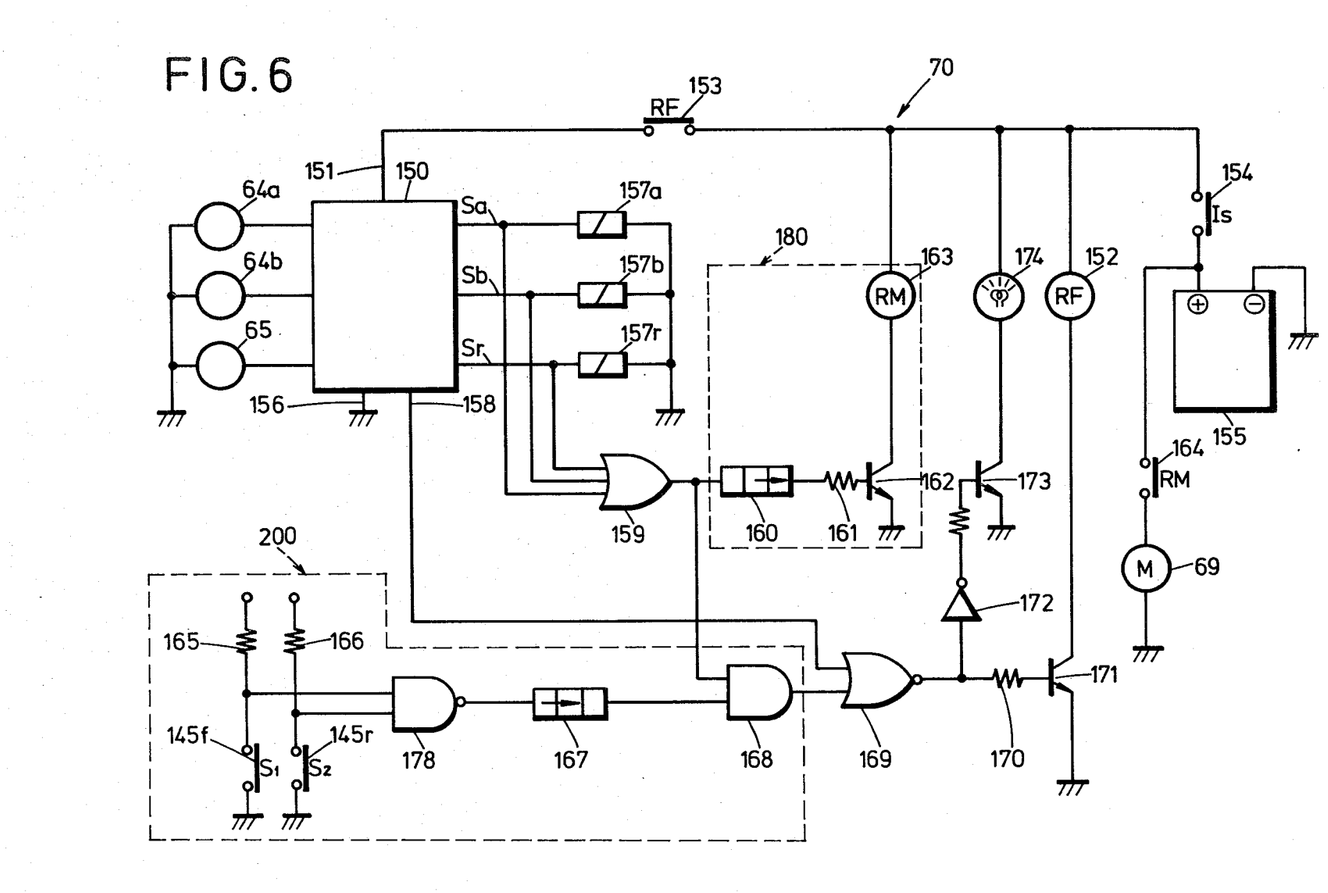
FIG. 6 is a circuit diagram of an electronic apparatus and the parts associated with the electronic apparatus in FIG. 4.

On the other hand, in FIG. 6, the contact portion 154 of the ignition switch is closed with the engine start. In the beginning of the braking operation, the control signals Sa, Sb and Sr are "0". Accordingly, the output of the OR gate 159 is "0". The output of the AND gate 168 is "0". The output of the fail signal output line 158 of the control unit 150 is initially "0", even though the control unit 150 fails. Accordingly, the output of the NOR gate 169 is initially "1". The transistor 171 becomes conductive. The fale safe relay 152 is energized to close the contact portion 153. The electric power is supplied to the control unit 150. When the control unit 150 is in order, the output of the fail signal output line 158 remains "0". When anyone of the control signals Sa, Sb and Sr becomes "½" or "1", the output of the OR gate 159 becomes "1", and it is supplied through the OFF delay timer 160 and the resistor 161 to the base of the transistor 162. The latter becomes conductive to energize the motor relay 163 and close the contact portion 164 thereof. The motor 69 starts to rotate and to drive the fluid pumps 68f and 68r. Although the output of the OR gate 159 is supplied to the one input terminal of the AND gate 168, the pump operation detecting signal, the level of which is "0", is supplied to the other input terminal of the AND gate 168, since the suction pressure of the fluid pumps 68f and 68r has reached the predetermined pressure not to close the switches 145f and 145r in the reservoir 145f and 145r. Accordingly, the output of the AND gate 168 remains "0". As soon as the brake fluid is discharged into the reservoirs 66f and 66r from the wheel cylinders 61a to 61d, it is pressurized and returned to the conduits 16f and 16r by the fluid pumps 68f and 68r. During the skid control operation, the control signals Sa, Sb and Sr change as "0", "½" or "1" in accordance with the skid conditions of the wheels 60a to 60d. Correspondingly, the change-over valves 67a, 67b and 67r take one of the positions A, B and C to increase, maintain at constant or decrease the brake fluid pressure.

The above-described control operations are repeated. Meanwhile, the vehicle speed reaches the desired speed, or the vehicle stops. The brake pedal 2 is released from treading. The skid control operation ends. The brake fluid returns through the change-over valves 67a, 67b and 67r taking the position A, from the wheel cylinders 61a to 61d into the master cylinder 1.

Next, there will be described the case that the control unit 150 fails.

The output of the line 158 of the control unit 150 becomes "1" with the failure thereof. It is supplied to the NOR gate 169. The output thereof becomes "0". Accordingly, the transistor 171 becomes non-conductive. The fail safe relay 152 is deenergized to open the contact portion 153 thereof. The control unit 150 is accordingly intercepted from the battery 155.

The output of the NOR gate 169 is inverted by the NOT gate 172. The output "1" thereof is supplied to the base of the transistor 173. The latter becomes conductive. The fail lamp 174 lights up to inform the driver of the failure of the skid control system.

Next, there will be described the case that the fluid pump 68f, 68r or the motor 69 for driving the fluid pumps 68f and 68r fails.

When the motor 69 fails or stops, both of the fluid pumps 68f and 68r stop. For example, it is assumed that only the fluid pump 68f fails. The suction pressure of the fluid pump 68f decreases or becomes zero. Accordingly, the brake fluid increases in the reserve chamber 130 of the reservoir 66f. The volume of the reserve chamber 130 increases to move the piston 123 downwards against the spring 125. The projection 126 of the piston 123 comes to contact with the movable switch member 132 to push the latter downwards. The contact element 133 of the movable switch member 132 contacts with the contact elements 142 and 143 of the stationary switch member 138.

In FIG. 6, the switch 145f is closed. The input to the one input terminal of the NAND gate 178 becomes "0". Accordingly, the output of the NAND gate 178 becomes "1", and it is supplied through the ON delay timer 167 to the one input terminal of the AND gate 168. The motor drive signal from the OR gate 159 is supplied to the other input terminal of the AND gate 168. The output of the AND gate 168 becomes "1". Thus, the pump fail detecting circuit 200 generates the pump fail detecting signal, which is supplied to the one input terminal of the NOR gate 169.

Accordingly, the output of the NOR gate 169 becomes "0". The transistor 171 becomes non-conductive, while the transistor 173 becomes conductive. The fail safe relay 152 is deenergized to open the contact portion 153 thereof. The control unit 150 is intercepted from the battery 155. The fail lamp 174 lights up to inform the driver of the failure of the skid control system.

When such a noise is applied to the control unit 150 that the brake fluid is rapidly discharged from the wheel cylinders 61a and 61b into the reservoir 66f, or when the frictional coefficient of the vehicle running road suddenly becomes so low that the brake fluid should be rapidly discharged from the wheel cylinders 61a and 61b into the reservoir 66f, the piston 123 is impulsively moved downwards to actuate the switch 145f, although the fluid pump 68f does not fail. The delay time of the ON delay timer 167 connected to the NAND gate 178 is determined in consideration of such a case, which is, for example, 0.1 second. Accordingly, when the switch 145f keeps being closed for longer than the delay time of the ON delay timer 167, it is judged that the skid control system has failed.

Although there has been described the case of the failure of the fluid pump 68f, it will be understood that the above description can be applied to the case of the failure of the fluid pump 68r or motor 69.

Such a failure can be detected that there is any leakage in the conduit system and so the suction pressure of the fluid pump 68f or 68r can not rise to the predetermined pressure, although the fluid pump 68f and the motor 69 do not fail.

While the preferred embodiments have been described, variations thereto will occur to those skilled in the art within the scope of the present inventive concepts which are delineated by the following claims.

For example, in the apparatus of FIG. 1, the switching arrangement 34, 35 for detecting the discharging pressure of the fluid pump 12 is arranged in the controllable check valve device 20. However, instead of the switching arrangement 34, 35, such a switch may be arranged in the accumulator 14 as to detect a predetermined displacement of the piston 45. Alternatively, a pressure switch may be connected to the conduit 4h. When the discharging pressure at the conduit 4h reaches the predetermined pressure, the pressure switch generates the pump operation signal.

Further, in the embodiment of FIG. 1, a throttle valve may be used instead of the pressure adjusting valve 15.

Further in the check valve device 20 of the embodiment of FIG. 1, the chamber 30 communicates through the inlet opening 22 with the fluid pressure generating chamber of the master cylinder 1. However, the chamber 30 may communicates with the atmosphere instead of the fluid pressure generating chamber of the master cylinder 1. In that case, the conduit to the inlet opening 22 is omitted, and a check valve is arranged instead of the pressure adjusting valve 15. The check valve is opened when brake fluid flows from the outlet of the fluid pump 12 to the pressure supply conduit 4a.

Further in the embodiment of FIG. 3, the switch 35 is opened when the discharging pressure of the fluid pump 12 does not reach the predetermined pressure. However, the switch 35 may be so designed as to be closed when the discharging pressure of the fluid pump 12 does not reach the predetermined pressure. In that case, the NOT gate 112 is omitted.

Further in the embodiment of FIG. 6, the output terminal of the OR gate 159 is connected to the AND gate 168. However, instead of that, the output terminal of the OFF delay timer 160 may be connected to the AND gate 168.

Further, in the above embodiments, the brake fluid pressure to the wheel cylinders 5a, 5b, 60a to 60d is decreased, maintained at constant and increased in accordance with the skid condition of the wheels. However, this invention may be applied to the skid control operation that the brake fluid pressure to the wheel cylinders is alternately decreased and increased in accordance with the skid condition of the wheels. In that case, two-position change-over valves may be used instead of the three-position change-over valves.

Further, the above embodiments are applied to the four-wheeled vehicle. However, this invention may be applied to a two-wheeled vehicle or a motor-cycle.

What is claimed is:

1. A brake fluid pressure control apparatus in a skid control system for a vehicle having at least one wheel and a brake for the wheel comprising:
   (A) a control unit for measuring the skid condition of the wheel;
   (B) a fluid pressure control valve device arranged between a master cylinder and a wheel cylinder of a brake for the wheel, said fluid pressure control valve device receiving control signals of said control unit to control the brake fluid pressure to said wheel cylinder;
   (C) a hydraulic reservoir which, when the brake fluid pressure to said wheel cylinder is decreased with control of said fluid pressure control valve device, reserves the brake fluid discharged through said fluid pressure control valve device from said wheel cylinder;
   (D) a pressure fluid supply conduit connecting said master cylinder with said fluid pressure control valve device;
   (E) a fluid pump with motor receiving a pump drive signal of said control unit for returning the brake fluid from said hydraulic reservoir into said pressure fluid supply conduit;
   (F) switching means for detecting operation of said fluid pump with motor, and generating an operation detecting signal when said fluid pump with motor effectively operates; and
   (G) pump fail detecting means receiving said pump drive signal of the control unit and the output of said switching means, said pump fail detecting means generating a pump fail detecting signal when said switching means, after and when receiving said pump drive signal, does not generate said operation detecting signal.

2. A brake fluid pressure control apparatus in a skid control system according to claim 1, in which said switching means detects the discharging pressure of said fluid pump with motor.

3. A brake fluid pressure control apparatus in a skid control system according to claim 1, in which said switching means is arranged in said hydraulic reservoir.

4. A brake fluid pressure control apparatus in a skid control system according to claim 2, in which said switching means comprises a cylinder body, a piston slidably fitted to said cylinder body, a spring urging said piston in one direction, two chambers formed by said piston in said cylinder body, and a switch, one of said two chambers communicating with the outlet of said fluid pump with motor, and the other of said two chambers communicating with the master cylinder, and when the discharging pressure of said fluid pump with motor becomes higher than a predetermined pressure, said piston moves towards said switch to actuate the latter.

5. A brake fluid pressure control apparatus in a skid control system according to claim 2, in which said switching means comprises a cylinder body, a piston slidably fitted to said cylinder body, a spring urging said piston in one direction, two chamber formed by said piston in said cylinder body, and a switch, one of said two chambers communicating with the outlet of said fluid pump with motor, and the other of said two chambers communicating with the air, and when the discharging pressure of said fluid pump with motor becomes higher than a predetermined pressure, said piston moves towards said switch to actuate the latter.

6. A brake fluid pressure control apparatus in a skid control system according to claim 4, in which a permanent magnet is fixed to said piston, and said switch is a magnetic sensing switch, detecting magnetic flux from said permanent magnet when said piston is moved towards said switch.

7. A brake fluid pressure control apparatus in a skid control system according to claim 5, in which a permanent magnet is fixed to said piston, and said switch is a magnetic sensing switch, detecting magnetic flux from said permanent magnet when said piston is moved towards said switch.

8. A brake fluid pressure control apparatus in a skid control system according to claim 2, in which said apparatus further includes a hydraulic accumulator connected to the outlet of said fluid pump with motor, said hydraulic accumulator including a cylinder body, a piston slidably fitted to said cylinder body and a spring urging said piston in one direction, and said switching means is arranged in said hydraulic accumulator, and actuated when the discharging pressure of said fluid pump with motor becomes higher then a predetermined pressure to move said piston against said spring.

9. A brake fluid pressure control apparatus in a skid control system according to claim 2, in which said apparatus further includes a pressure adjusting valve connected between the outlet of said fluid pump with motor and said pressure fluid supply conduit, and said switching means is connected to a conduit connecting the outlet of said fluid pump with motor and the inlet opening of said pressure adjusting valve.

10. A brake fluid pressure control apparatus in a skid control system according to claim 2, in which said apparatus further includes a hydraulic accumulator connected to the outlet of said fluid pump with motor, and said switching means is connected to a conduit connecting the outlet of said fluid pump with motor and said hydraulic accumulator.

11. A brake fluid pressure control apparatus in a skid control system according to claim 2, in which said apparatus further includes a check valve connected between the outlet of said fluid pump with motor and said pressure fluid supply conduit, and said switching means is connected to a conduit connected to the outlet of said fluid pump with motor and said check valve.

12. A brake fluid pressure control apparatus in a skid control system according to claim 2, in which said apparatus further includes a throttle valve connected between the outlet of said fluid pump with motor and said pressure fluid supply conduit, and said switching means is connected to a conduit connecting the outlet of said fluid pump with motor and said throttle valve.

13. A brake fluid pressure control apparatus in a skid control system according to claim 3, in which said hydraulic reservoir includes a cylinder body, a piston slidably fitted to said cylinder body, a spring urging said piston in one direction, and when said fluid pump with motor does not effectively operates, said piston is moved in a direction opposite to said one direction by the brake fluid discharged from said wheel cylinder, and actuates said switching means not so as to generate said operating detecting signal.

14. A brake fluid pressure control apparatus in a skid control system according to claim 13, in which said switching means includes a movable contact element, and two stationary contact elements, and when said fluid pump with motor does not effectively operate, said movable contact element is pushed by said piston so as to contact with said two contact elements.

15. A brake fluid pressure control apparatus in a skid control system according to claim 2, in which said pump fail detecting means includes an ON delay timer, and said pump drive signal is supplied to an input terminal of said ON delay timer.

16. A brake fluid pressure control apparatus in a skid control system according to claim 3, in which said pump fail detecting means includes an ON delay timer, and said pump drive signal is supplied to an input terminal of said ON delay timer.

17. A brake fluid pressure control apparatus in a skid control system according to claim 2, in which said pump fail detecting means includes an AND gate and an ON delay timer connected to one input terminal of said AND gate, and said switching means includes two stationary contacts, one of which is connected to the ground and to the other of which a positive potential is applied, the other contact being connected to another input terminal of said AND gate, and said two contacts being connected to each other when said fluid pump with motor effectively operates.

18. A brake fluid pressure control apparatus in a skid control system according to claim 2, in which said pump fail detecting means includes a monostable multivibrator, to an input terminal of which said pump drive signal is supplied, a flip flop, to a set terminal of which an output terminal of said monostable multivibrator is connected, an ON delay timer connected to a Q output terminal of said flip flop, and a NOT gate connected to an reset terminal of said flip flop, and said switching means includes two stationary contacts, one of which is connected to the ground and to the other of which a positive potential is applied, the other contact being connected to an input terminal of said NOT gate, and said tow contacts being connected to each other when said fluid pump with motor effectively operates.

19. A brake fluid pressure control apparatus in a skid control system according to claim 2, in which said pump fail detecting means includes a monostable multivibrator, to an input terminal of which said pump drive signal is supplied, a flip flop, to a set terminal of which an output terminal of said monostable multivibrator is connected, and an ON delay timer connected to a Q output terminal of said flip flop, and said switching means includes two stationary contacts, one of which is connected to the ground and to the other of which a positive potential is applied, the other contact being connected to a reset terminal of said flip flop, and said two contacts being separated from each other when said fluid pump with motor effectively operates.

20. A brake fluid pressure control apparatus in a skid control system according to claim 3, in which said pump fail detecting means includes an AND gate, an ON delay timer connected to one input terminal of said AND gate, and a NOT gate the output terminal of which is connected to the input terminal of said ON delay timer, said pump drive signal being supplied to another input terminal of said AND gate, and said switching means includes two stationary contacts, one of which is connected to the ground and to the other of which a positive potential is applied, the other contact being connected to the input terminal of said NOT gate, and said two contacts being separated from each other when said fluid pump with motor effectively operates.

* * * * *